Figure 1:
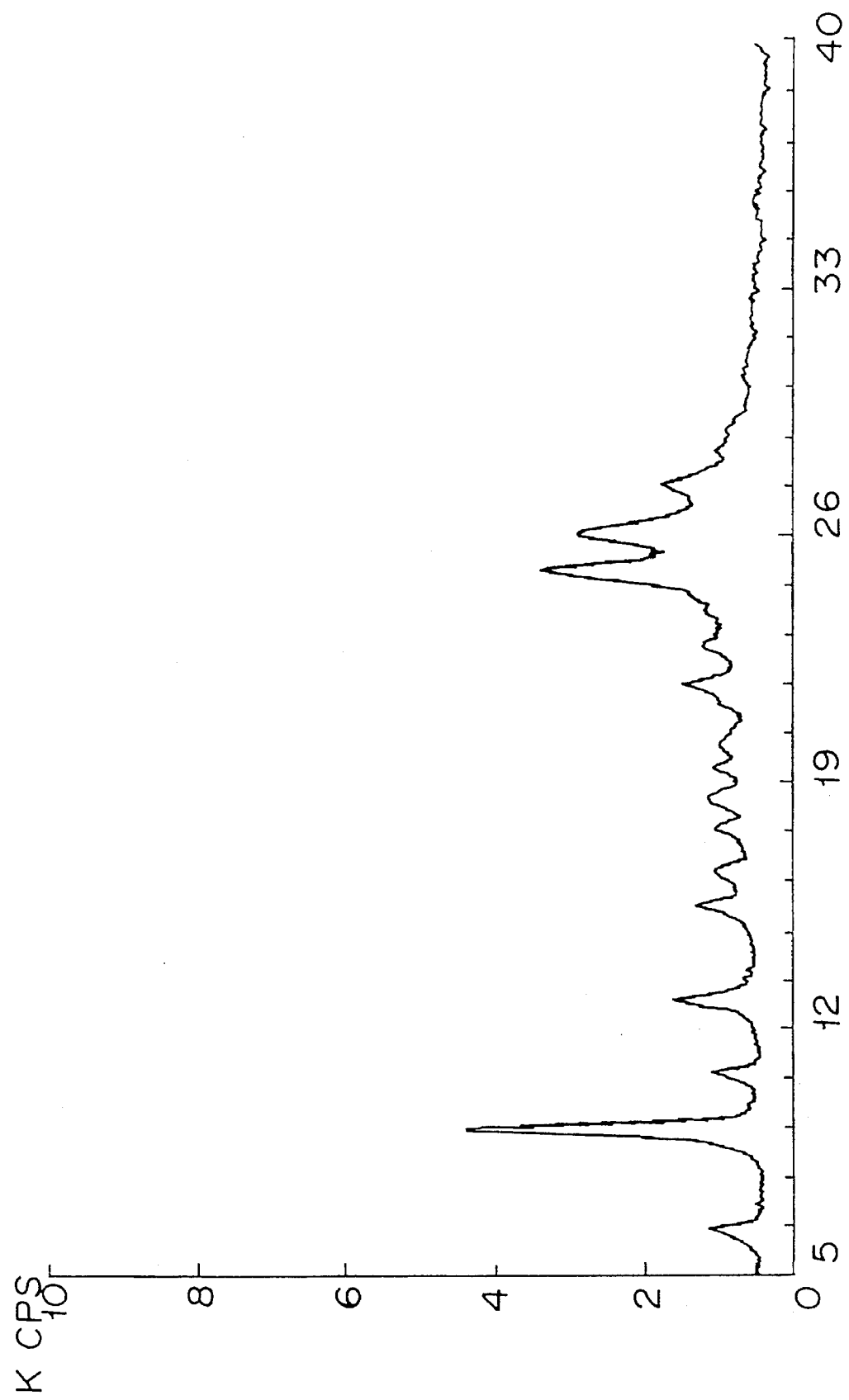

United States Patent [19]

Hihara et al.

[11] Patent Number: 5,569,309
[45] Date of Patent: Oct. 29, 1996

[54] DISPERSE DYE COMPOSITIONS

[75] Inventors: Toshio Hihara; Kiyoshi Himeno, both of Kitakyushu, Japan

[73] Assignee: Dystar Japan Ltd., Osaka, Japan

[21] Appl. No.: 444,576

[22] Filed: May 19, 1995

[30] Foreign Application Priority Data

May 23, 1994 [JP] Japan .................................. 6-132533

[51] Int. Cl.⁶ .......................... C09B 29/033; C09B 67/22
[52] U.S. Cl. ......................... 8/639; 8/643; 8/677; 8/696
[58] Field of Search .............................. 8/639, 643, 677, 8/696

[56] References Cited

U.S. PATENT DOCUMENTS

| | | | |
|---|---|---|---|
| 4,908,041 | 3/1990 | Hahn et al. | 8/638 |
| 5,062,861 | 11/1991 | Hahn et al. | 8/639 |
| 5,340,930 | 8/1994 | Himeno et al. | 534/753 |
| 5,382,263 | 1/1995 | Degen et al. | 8/638 |

FOREIGN PATENT DOCUMENTS

| | | |
|---|---|---|
| 0311910 | 4/1989 | European Pat. Off. . |
| 0347685 | 12/1989 | European Pat. Off. . |
| 0441166 | 8/1991 | European Pat. Off. . |
| 0535424 | 4/1993 | European Pat. Off. . |
| 0561215 | 9/1993 | European Pat. Off. ........ C09B 67/22 |
| 2280743 | 2/1976 | France . |
| WO93/23479 | 11/1993 | WIPO . |

OTHER PUBLICATIONS

Chemical Abstracts, vol. 93, No. 20, Nov. 17, 1980, AN–187744f, CS–182650, Apr. 15, 1980.
Chemical Abstracts, vol. 101, No. 18, Oct. 29, 1984, AN–153476p, JP–59–96168, Jun. 2, 1984.
Chemical Abstracts, vol. 101, No. 16, Oct. 15, 1984, AN–132454q, JP–59–093751, May 30, 1984.

*Primary Examiner*—Margaret Einsmann
*Attorney, Agent, or Firm*—Oblon, Spivak, McClelland, Maier & Neustadt, P.C.

[57] ABSTRACT

A dye composition containing at least one turquoise blue monoazo dye of the formula (I):

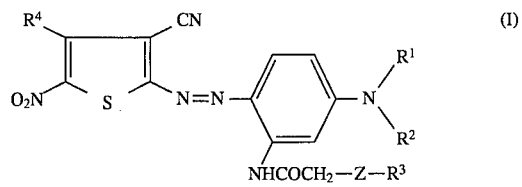

and at least one additional dye which is at least one yellow monoazo dye of the formula (II):

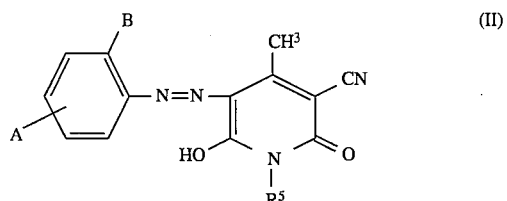

or at least one blue anthraquinone dye of the formula (III):

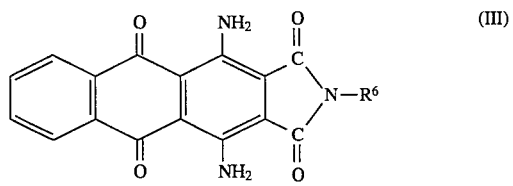

or at least one navy blue dye of the formula (IV):

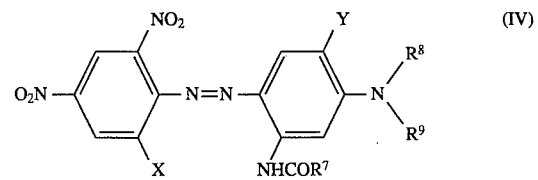

12 Claims, 1 Drawing Sheet

DISPERSE DYE COMPOSITIONS

The present invention relates to disperse dye compositions. Particularly, it relates to green, turquoise blue and navy blue disperse dye compositions which are excellent in the temperature dependency in high temperature dyeing, the build up property and the sublimation fastness.

In dyeing, it is common to blend various dyes to dye fabrics with a desired color. However, it is often difficult to obtain a desired color or to obtain a dye composition having good dyeing properties, since dyeing properties of the dyes to be blended are different.

In recent years, in a research for developing disperse dyes capable of dyeing polyester fibers with turquoise blue, a study has been made to develop a disperse dye composition containing as the main component a monoazo dye having high tinctorial strength as compared with an anthraquinone-type turquoise blue dye, which is excellent in the pH dependency and the temperature dependency at the time of dyeing and which is excellent also in the build up property and the sublimation fastness. However, a disperse dye composition which is fully satisfactory has not yet been developed.

The present inventors have conducted extensive studies to develop a dye composition capable of dyeing polyester fibers with blue color, and as a result, have found blue dye compositions, particularly turquoise blue, navy blue and green disperse dye compositions, which are excellent in the temperature dependency in dyeing, the build up property and the sublimation fastness and which have high tinctorial strength. The present invention has been accomplished on the basis of this discovery.

The present invention provides a green dye composition comprising at least one turquoise blue monoazo dye of the following formula (I):

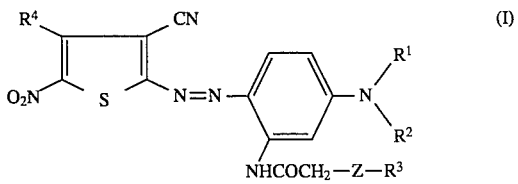

wherein each of $R^1$ and $R^2$ which are independent of each other, is a $C_1$–$C_5$ alkyl group, an allyl group or a $C_1$–$C_4$ alkoxy $C_2$–$C_3$ alkyl group, $R^3$ is a $C_1$–$C_5$ alkyl group, a $C_1$–$C_4$ alkoxy $C_2$–$C_3$ alkyl group or a phenyl group, $R^4$ is a hydrogen atom, a halogen atom or a methyl group, and Z is an oxygen atom or a sulfur atom, and at least one yellow monoazo dye of the following formula (II):

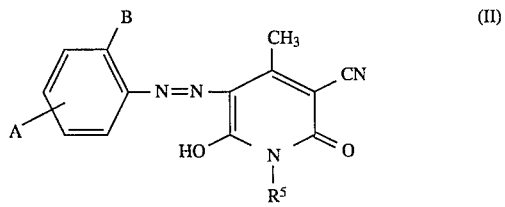

wherein A is a hydrogen atom, a halogen atom,

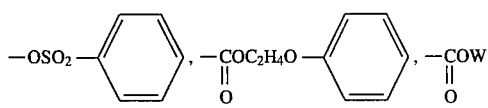

(wherein W is a $C_4$–$C_8$ alkyl group),

(wherein W is as defined above) or

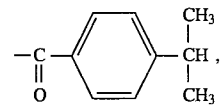

B is a hydrogen atom or a nitro group, and $R^5$ is a $C_1$–$C_8$ alkyl group or a $C_1$–$C_3$ alkoxy $C_1$–$C_3$ alkyl group.

Further, the present invention provides a turquoise blue dye composition comprising at least one dye of the formula (I) and at least one blue anthraquinone dye of the following formula (III):

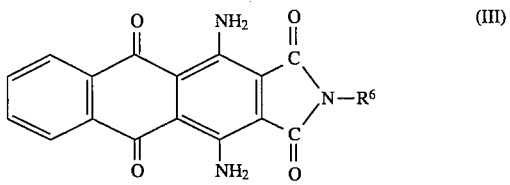

wherein $R^6$ is a $C_3$–$C_4$ alkyl group, a $C_1$–$C_4$ alkoxy $C_2$–$C_3$ alkyl group or a $C_1$–$C_2$ alkoxy $C_2$–$C_3$ alkoxy $C_2$–$C_3$ alkyl group.

Still further, the present invention provides a navy blue dye composition comprising at least one dye of the formula (I) and at least one navy blue dye of the following formula (IV):

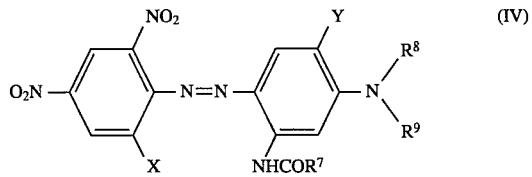

wherein X is a halogen atom, Y is a hydrogen atom, a $C_1$–$C_2$ alkoxy group or a $C_1$–$C_2$ alkoxy $C_1$–$C_2$ alkoxy group, $R^7$ is a $C_1$–$C_5$ alkyl group, and each of $R^8$ and $R^9$ which are independent of each other, is a hydrogen atom, an allyl group or a $C_1$–$C_5$ alkyl group, provided that $R^8$ and $R^9$ are not simultaneously hydrogen atoms.

In the accompanying drawing, FIG. 1 is the X-ray diffraction pattern of the turquoise blue dye used in Example 1 of the present invention, wherein the abscissa represents the diffraction angle (2θ), and the ordinate represents the diffraction intensity.

Now, the present invention will be described in detail with reference to the preferred embodiments.

In the above formulas (I) to (IV), the $C_1$–$C_5$ alkyl group for each of $R^1$, $R^2$, $R^3$, $R^7$, $R^8$ and $R^9$ may, for example, be a straight chain or branched chain $C_1$–$C_5$ alkyl group such as a methyl group, an ethyl group, a n-propyl group, an i-propyl group, a n-butyl group, a sec-butyl group or a n-pentyl group.

The $C_1$–$C_4$ alkoxy $C_2$–$C_3$ alkyl group for each of $R^1$, $R^2$, $R^3$ and $R^6$ may, for example, be a methoxyethyl group, an ethoxyethyl group, a methoxypropyl group, an ethoxypropyl group, a propoxyethyl group, a propoxypropyl group, a butoxyethyl group or a butoxypropyl group.

The halogen atom for each of $R^4$, A and X may, for example, be a chlorine atom, a bromine atom or a fluorine atom. Particularly preferred is a chlorine atom or a bromine atom.

The $C_1$–$C_8$ alkyl group for $R^5$ may, for example, be n-hexyl group, a n-octyl group or a 2-ethylhexyl group in addition to the above-mentioned $C_1$–$C_5$ straight chain or branched chain alkyl group, and the $C_1$–$C_3$ alkoxy $C_1$–$C_3$ alkyl group for $R^5$ may, for example, be a methoxypropyl group, an ethoxypropyl group or an i-propoxypropyl group.

As the $C_1$–$C_4$ alkoxy $C_2$–$C_3$ alkyl group for $R^6$, a methoxypropyl group, an ethoxypropyl group or a propoxypropyl group is preferred, and the $C_1$–$C_2$ alkoxy $C_2$–$C_3$ alkoxy $C_2$–$C_3$ alkyl group for $R^6$ may, for example, be a methoxyethoxypropyl group, an ethoxyethoxypropyl group, a methoxypropoxyethyl group or an ethoxypropoxypropyl group, preferably a methoxyethoxypropyl group.

W is preferably a 2-ethylhexyl group or a n-octyl group.

Y is preferably a hydrogen atom, a methoxy group or a methoxyethoxy group.

Among dyes of the formula (I), preferred is a dye wherein each of $R^1$ and $R^2$ is a $C_2$–$C_3$ straight chain alkyl group, $R^3$ is a $C_1$–$C_2$ alkyl group or a $C_1$–$C_4$ alkoxy $C_2$–$C_3$ alkyl group, $R^4$ is a hydrogen atom, and Z is an oxygen atom. Particularly preferred is a dye wherein each of $R^1$ and $R^2$ is an ethyl group, $R^3$ is a methyl group, $R^4$ is a hydrogen atom, and Z is an oxygen atom, which has a crystal structure characterized by X-ray diffraction peaks as defined hereinafter.

FIG. 1 is an X-ray diffraction pattern of a dye obtained by applying specific treatment to a cake of a dye having the above-mentioned substituents, obtained by recording the diffraction state by CuKα rays in powder X-ray diffractometry by means of a proportional counter, wherein the abscissa represents the diffraction angle (2θ), and the ordinate represents the diffraction intensity. As shown in FIG. 1, relatively strong peaks are observed at diffraction angles (2θ) of 9.4°, 25.6° and 26.6°, and intermediate peaks are observed at diffraction angles (2θ) of 6.4°, 13.1°, 22.2° and 28.1°. The above numerical values of the X-ray diffraction angles may shift to either plus or minus within a range of about ±0.2.

As the specific treatment to obtain the dye having the above-mentioned crystalline structure, it is possible to employ, for example, ① a method wherein the dye cake having the amorphous structure is dispersed in an aqueous medium and subjected to stirring treatment at a temperature of from 60° to 130° C., preferably from 80° to 100° C., for from 0.5 to 30 hours, preferably from 1 to 10 hours, if necessary in the presence of a dispersant such as a condensate of naphthalenesulfonic acid with formaldehyde or a concentrate of a sulfite pulp waste liquor containing sodium lignin sulfonate as the main component, ② a method wherein the dye cake having the amorphous structure is dispersed in an organic solvent, for example, an alcohol such as methanol, ethanol or butanol, an ether such as dioxane, ethylene glycol, or glycol ether and subjected to stirring treatment at a temperature of from 15° to 100° C., preferably from 20° to 80° C., for from 0.5 to 10 hours, or ③ a method wherein 2-amino-5-nitro-3-cyanothiophene is diazotized by a conventional method, followed by coupling with 3-methoxyacetylamino-N,N-diethylaniline as a coupler in an alcoholic medium, such as methanol or ethanol, or in an organic solvent such as ethylene glycol or glycol ether at a temperature of from 5° to 30° C., for from 1.0 to 10 hours.

Among dyes of the formula (II), preferred is a dye wherein A is

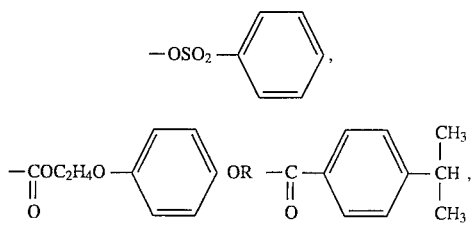

and $R^5$ is a $C_1$–$C_3$ alkyl group.

Among dyes of the formula (III), preferred is a dye wherein $R^6$ is a $C_1$–$C_2$ alkoxy $C_2$–$C_3$ alkoxy group or a $C_1$ alkoxy $C_2$ alkoxy $C_2$–$C_3$ alkyl group.

Among dyes of the formula (IV), preferred is a dye in which X is a chlorine atom or a bromine atom, Y is a hydrogen atom, a methoxy group or a methoxyethoxy group, $R^7$ is a methyl group or an ethyl group, $R^8$ is a hydrogen atom or a $C_2$–$C_3$ alkyl group, and $R^9$ is a $C_2$–$C_3$ alkyl group.

By blending the turquoise blue dye of the formula (I) and the yellow dye of the formula (II), it is possible to obtain a green dye composition which is excellent in the temperature dependency, the build up property and the sublimation fastness. In this case, the blend ratio is preferably such that the yellow dye of the formula (II) is in an amount of from 0.03 to 1.5 times by weight, particularly preferably from 0.1 to 1.0 time by weight, relative to the turquoise blue dye of the formula (I).

Further, when the turquoise blue dye of the formula (I) is blended with the blue anthraquinone dye of the formula (III), it is possible to obtain a blue dye composition which is excellent in the light fastness, the sublimation fastness, the brightness, the leveling property, the temperature dependency, the build up property and the pH dependency and which is well balanced in these dyeing properties. In this case, the blend ratio is preferably such that the blue anthraquinone dye of the formula (III) is from 0.5 to 5 times by weight, particularly preferably from 1 to 4 times by weight, relative to the turquoise blue dye of the formula (I).

Further, when the turquoise blue dye of the formula (I) is blended with the navy blue dye of the formula (IV), it is possible to obtain a navy blue dye composition which is excellent in the temperature dependency, the build up property and the sublimation fastness and which has a low color rendering property under various light sources. In this case, the blend ratio is preferably such that the navy blue dye of the formula (IV) is from 0.03 to 2.0 times by weight, particularly preferably from 0.1 to 1.2 times by weight, relative to the turquoise blue dye of the formula (I).

Fibers dyeable by the disperse dye compositions of the present invention may, for example, be polyester fibers made of polyethylene terephthalate, polybutylene terephthalate or a polycondensation product of terephthalic acid with 1,4-bis(hydroxymethyl)cyclohexane, or a mixed fiber product such as a blended yarn fabric or a combined yarn fabric comprising natural fibers such as cotton, silk or wool and the above-mentioned polyester fibers.

The dye compositions of the present invention are insoluble or hardly soluble in water. Accordingly, they may be dispersed in an aqueous medium by using, as a dispersant, a condensation product of naphthalene sulfonic acid with formaldehyde, a higher alcohol sulfuric acid ester or a higher alkylbenzene sulfonate to obtain a dyeing bath or a printing paste. Fibers can be dyed by dip dyeing (exhaustion dyeing) or printing.

For example, in the case of dip dyeing, polyester fibers or fiber mixture products thereof can be dyed with good color fastness by common dyeing methods, such as a high temperature dyeing method or a thermosol dyeing method. In such a case, it is sometimes possible to obtain better results by an addition of a known acidic substance such as formic acid, acetic acid, phosphoric acid or ammonium sulfate to the dyeing bath. Further, it is usually preferred to adjust the pH of the dyeing bath within a range of from 4.0 to 8.0. The dyeing temperature may, for example, be at a level of from 120° to 140° C.

The disperse dye compositions of the present invention exhibit particularly excellent dyeing properties and temperature dependency when they are applied to dip dyeing. Dyeing conditions in the dip dyeing are not particularly limited. For example, the dyeing temperature may be at a level of from 120° to 140° C., and the dyeing time may be at a level of from 30 to 60 minutes. The pH of the dyeing bath may be at a level of from 4.0 to 8.0.

Further, for the purpose of adjusting the shade of the dyed products, at most 0.1 time by weight of other yellow, red or blue disperse dyes may be combined to the disperse dye compositions of the present invention.

Now, the present invention will be described in further detail with reference to Examples. However, it should be understood that the present invention is by no means restricted to such specific Examples.

EXAMPLE 1

140 g of a lignin sulfonic acid-formalin condensation product and 650 g of water were mixed to 30 g of a turquoise blue dye of the following formula (I-1) as the dye of the formula (I) which had a crystal structure characterized by an X-ray diffraction pattern (CuKα) showing relatively strong peaks at diffraction angles (2θ) of 9.4°, 25.6° and 26.6° and intermediate peaks at diffraction angles (2θ) of 6.4°, 13.1°, 22.2° and 28.1° and 10 g of a yellow dye of the following formula (II-1) as the dye of the formula (II). The mixture was subjected to colloid milling by a sand grinder and then spray-dried.

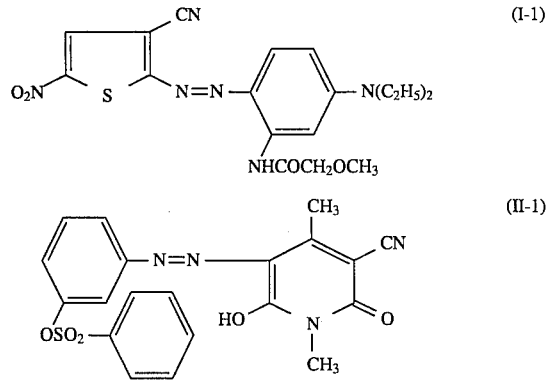

To each of 0.1 g and 0.4 g of this powdery disperse dye composition, 0.08 g of a nonionic leveling agent (Diaserver® LR-PSL, manufactured by Mitsubishi Chemical Corporation) and 150 ml of water were added to obtain a dyeing bath. After adjusting the pH to 5.5, 5 g of a polyester cloth was immersed, and exhaustion dyeing was carried out at 130° C. and 120° C. for 60 minutes, followed by soaping, washing with water and drying to obtain a dyed product of a green color having excellent leveling property. With respect to the dyed cloth, the temperature dependency, the build up property and the sublimation fastness were measured as will be described hereinafter, whereby the temperature dependency was 96, the build up property was 355, and the sublimation fastness was grade 4+.

Temperature dependency:

The dyed color density of the dyed cloth which was dyed at 130° for 60 minutes by using 0.1 g of the dye composition, was evaluated to be 100, and the dyed color density of the dyed cloth which was dyed at 120° C. for 60 minutes under the same condition was represented by a relative value. The dyed color density was obtained as a K/S value from the reflectance of the dyed product measured by Macbeth 2020+. The ideal value is 100.

Build up property:

The dyed color density of the dyed cloth which was dyed at 130° C. for 60 minutes by using 0.1 g of the dye composition, was evaluated to be 100. Whereas, the dyed color density of the dyed cloth which was dyed under the same conditions by using 0.4 g of the dye composition was represented by a relative value. The dyed color density was measured in the same manner as for the temperature dependency. The ideal value is 400.

Sublimation fastness:

The dyed cloth which was dyed at 130° C. for 60 minutes by using 0.1 g of the dye composition, was treated at 180° C. for 45 seconds in accordance with JIS L0879-1968, whereupon the staining degree of a nylon white cloth was evaluated by a gray scale.

EXAMPLES 2-1 to 2-4

Dyeing was carried out in the same manner as in Example 1 except that the yellow dye of the formula (II-1) used as the dye of (II) in Example 1 was changed to each of the following dyes of the formulas (II-2) to (II-5), to obtain dyed cloths of green color. The dyeing properties of the dyed cloths were evaluated in the same manner as in Example 1, whereby the temperature dependency was at least 90, the build up property was at least 340, and the sublimation fastness was at least grade 4.

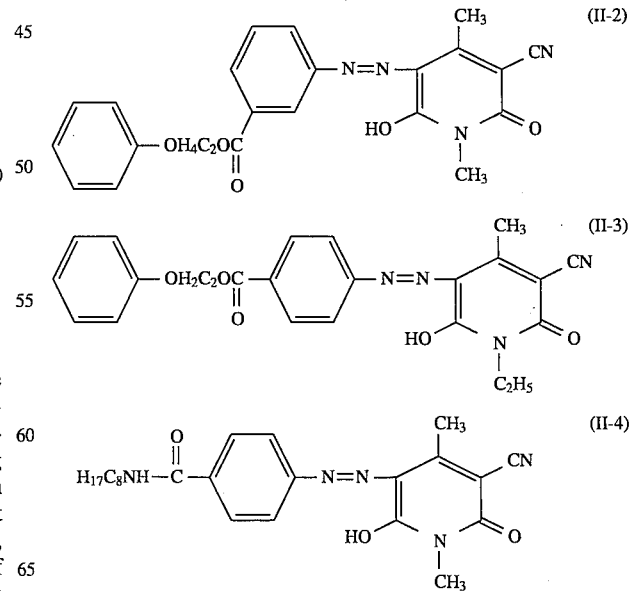

-continued

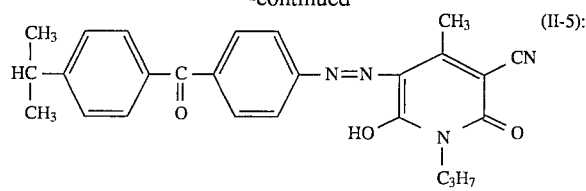
(II-5)

(II), to obtain dyed cloths of green color. The dyeing properties of the dyed cloths were evaluated in the same manner as in Example 1, whereby the temperature dependency was at least 90, the build up property was at least 310, and the sublimation fastness was at last grade 4⁻.

EXAMPLES 3-1 to 3-4

Dyeing was carried out in the same manner as in Example 1 by using the dyes as identified in Table 1 in the amounts as identified in Table 1, as the dyes of the formulas (I) and

EXAMPLE 4

140 g of a lignin sulfonic acid-formalin condensation product and 650 g of water were mixed to 10 g of a turquoise blue dye of the formula (I-1) as used in Example 1, as the dye of the formula (I) and 30 g of a blue anthraquinone dye of the following formula (III-1), as the dye of the formula (III). The mixture was subjected to colloid milling by a sand grinder and then spray-dried.

Using 0.1 g and 0.4 g of this powdery dye composition, exhaustion dyeing was carried out at pH 5.5 at 130° C. and 120° C. for 60 minutes in the same manner as in Example 1. The dyeing properties of the obtained dyed cloth were evaluated in the same manner as in Example 1, whereby the temperature dependency was 90, the build up property was 345 and the sublimation fastness was grade $4^+$.

EXAMPLES 5-1 to 5-6

Dyeing was carried out in the same manner as in Example 4 using the dyes as identified in Table 2 in the amounts as identified in Table 2, as the dyes of the formulas (I) and (III), whereby dyed cloths of turquoise blue having a temperature dependency of at least 85, a build up property of at least 310 and the sublimation fastness of at least grade 4, were obtained.

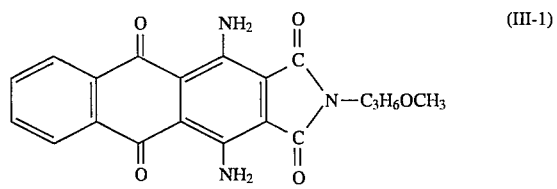
(III-1)

TABLE 2

| Examples | (I) | | (III) | |
|---|---|---|---|---|
| 5-1 | [thiophene azo dye with $O_2N$, CN, $N(C_3H_7)_2$, $NHCOCH_2OCH_3$] | 8 g | [anthraquinone dye with $NH_2$, $N-C_4H_9(n)$] | 32 g |
| 5-2 | [thiophene azo dye with $O_2N$, CN, $N(C_2H_5)_2$, $NHCOCH_2OCH_3$] | 20 g | [anthraquinone dye with $NH_2$, $N-C_3H_6OCH_3$] | 10 g |
|  |  |  | [anthraquinone dye with $NH_2$, $N-C_3H_6OC_2H_5$] | 10 g |
| 5-3 | [thiophene azo dye with $O_2N$, CN, $N(C_2H_5)_2$, $NHCOCH_2OC_4H_9$] | 15 g | [anthraquinone dye with $NH_2$, $N-C_3H_6OC_3H_7$] | 25 g |
| 5-4 | [thiophene azo dye with Cl, $O_2N$, CN, $N(C_2H_5)_2$, $NHCOCH_2OC_3H_7$] | 14 g | [anthraquinone dye with $NH_2$, $N-C_3H_6OCH_3$] | 13 g |

TABLE 2-continued

| Examples | (I) | | (III) | |
|---|---|---|---|---|
| | | | 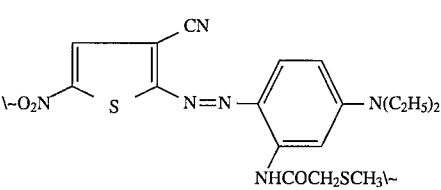 | 13 g |
| 5-5 | 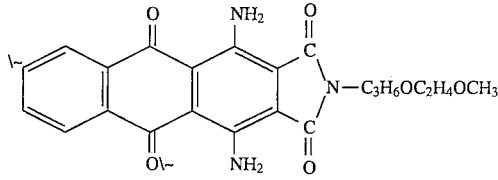 | 20 g | 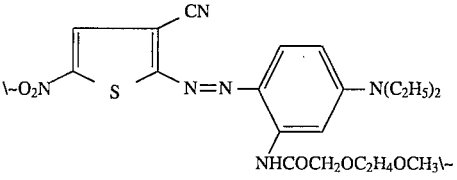 | 20 g |
| 5-6 | 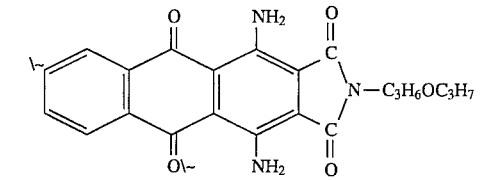 | 15 g | 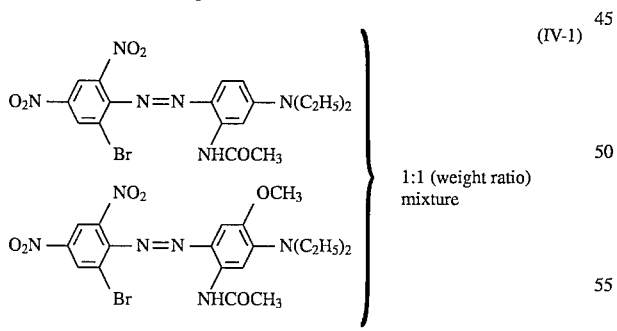 | 20 g |

EXAMPLE 6

140 g of a lignin sulfonic acid-formalin condensation product and 650 g of water were mixed to 10 g of a turquoise blue dye of the formula (I-1) as used in Example 1, as the dye of the formula (I) and 10 g of a navy blue dye of the following formula (IV-1), as the dye of the formula (IV). The mixture was subjected to colloid milling by a sand grinder and then spray-dried.

Using 0.1 g and 0.4 g of this powdery dye composition, exhaustion dyeing was carried out at pH 5.5 at 130° C. and 120° C. for 60 minutes in the same manner as in Example 1, whereby dyed cloth of navy blue having a temperature dependency of 97, a build up property of 370 and a sublimation fastness of grade 4, was obtained.

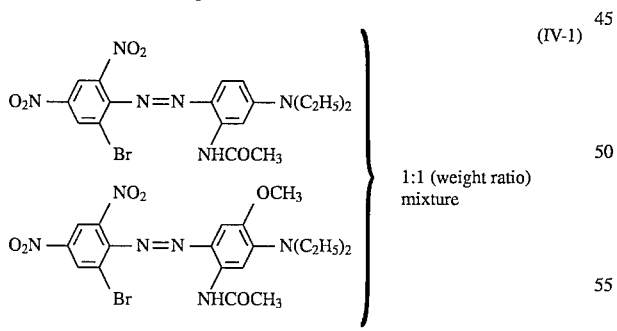

1:1 (weight ratio) mixture (IV-1)

Further, the color rendering property of the dyed cloth was evaluated in accordance with the following method, whereby the color was substantially the same even when the light source was different.

Color rendering property:

The color under standard A light of the dyed cloth which was dyed at 130° C. for 60 minutes at pH 5.5 by using 0.4 g of the dye composition was used as the standard, and the difference of the color under standard C light was visually evaluated.

Further, when the dye of the formula (I-1) was not used, the dyed cloth was remarkably reddish under standard C light as compared with the color under standard A light.

EXAMPLES 7-1 to 7-8

Dyeing was carried out in the same manner as in Example 6 except that the turquoise blue dye of the formula (I) and the navy blue dye of the formula (IV) used in Example 6 were changed to those identified in Table 3, whereby dyed cloths of navy blue having a temperature dependency of at least 90, a build up property of at least 340 and a sublimation fastness of at least 4⁻ and having a low color rendering property, were obtained.

TABLE 3

| Examples | (I) | | (IV) | |
|---|---|---|---|---|
| 7-1 | 5-nitro-thiophene-CN azo 2-(N(C₂H₅)₂, NHCOCH₂OCH₃)-phenyl | 12 g | 2,4-dinitro-6-bromophenyl azo 4-N(C₂H₅)₂, 2-NHCOCH₃ phenyl | 5 g |
|  |  |  | 2,4-dinitro-6-chlorophenyl azo (2-OCH₃, 4-N(C₂H₅)₂, 5-NHCOCH₃)-phenyl | 5 g |
| 7-2 | 5-nitro-thiophene-CN azo 2-(N(C₂H₅)₂, NHCOCH₂OCH₃)-phenyl | 10 g | 2,4-dinitro-6-chlorophenyl azo (2-OC₂H₅, 4-NHC₃H₇(n), 5-NHCOC₂H₅)-phenyl | 12 g |
|  |  |  | 2,4-dinitro-6-chlorophenyl azo (2-OCH₃, 4-N(C₂H₅)₂, 5-NHCOC₂H₅)-phenyl | 5 g |
| 7-3 | 5-nitro-thiophene-CN azo 2-(N(C₂H₅)₂, NHCOCH₂OCH₃)-phenyl | 7 g | 2,4-dinitro-6-bromophenyl azo (2-OC₂H₄OCH₃, 4-NHC₂H₅, 5-NHCOC₂H₅)-phenyl | 5 g |
|  |  |  | 2,4-dinitro-6-chlorophenyl azo (2-OCH₃, 4-NHC₂H₅, 5-NHCOCH₃)-phenyl | 3 g |
| 7-4 | 5-nitro-thiophene-CN azo 2-(N(C₂H₅)₂, NHCOCH₂OC₂H₄OCH₃)-phenyl | 10 g | 2,4-dinitro-6-bromophenyl azo (2-OC₂H₄OCH₃, 4-NHC₂H₅, 5-NHCOC₂H₅)-phenyl | 5 g |
|  |  |  | 2,4-dinitro-6-chlorophenyl azo (2-OCH₃, 4-NHC₂H₅, 5-NHCOCH₃)-phenyl | 3 g |

TABLE 3-continued

| Examples | (I) | | (IV) | |
|---|---|---|---|---|
| 7-5 | 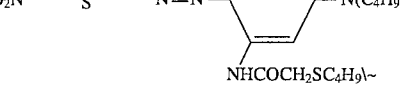 | 10 g | 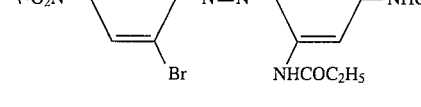 | 5 g, 3 g |
| 7-6 |  | 10 g | 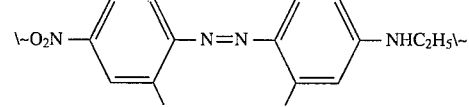 | 5 g, 5 g |
| 7-7 | 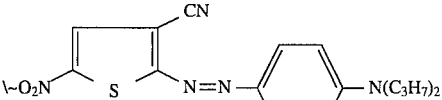 | 5 g, 5 g | 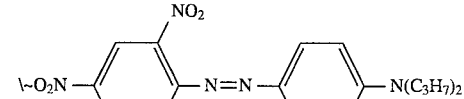 | 10 g |
| 7-8 | 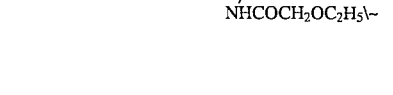 | 10 g | 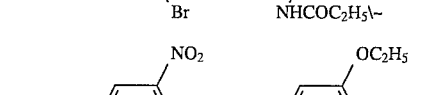 | 5 g, 5 g |

As described in the foregoing, the disperse dye compositions of the present invention are excellent in the temperature dependency, the build up property and the sublimation fastness, and they are capable of dyeing polyester fibers green, blue or navy blue. Thus, they contribute to enrichment of the dyeing techniques for polyester fibers.

What is claimed is:

1. A green dye composition comprising at least one turquoise blue monoazo dye of the following formula (I):

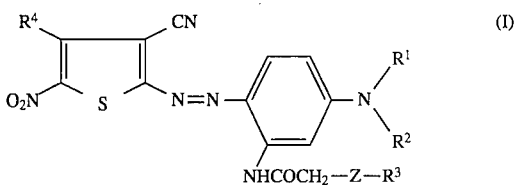

wherein each of $R^1$ and $R^2$ which are independent of each other, is a $C_1$–$C_5$ alkyl group, an allyl group or a $C_1$–$C_4$ alkoxy $C_2$–$C_3$ alkyl group, $R^3$ is a $C_1$–$C_5$ alkyl group, a $C_1$–$C_4$ alkoxy $C_2$–$C_3$ alkyl group or a phenyl group, $R^4$ is a hydrogen atom, a halogen atom or a methyl group, and Z is an oxygen atom or a sulfur atom, and at least one yellow monoazo dye of the following formula (II):

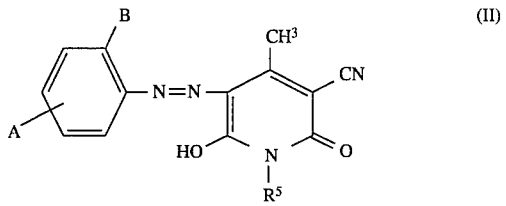

wherein A is a hydrogen atom, a halogen atom,

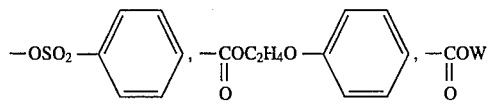

(wherein W is a $C_4$–$C_8$ alkyl group),

(wherein W is as defined above) or

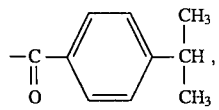

B is a hydrogen atom or a nitro group and $R^5$ is a $C_1$–$C_8$ alkyl group or a $C_1$–$C_3$ alkoxy $C_1$–$C_3$ alkyl group.

2. The dye composition according to claim 1, wherein in the formula (I), each of $R^1$ and $R^2$ is a $C_2$–$C_3$ straight chain alkyl group, $R^3$ is a $C_1$–$C_2$ alkyl group or a $C_1$–$C_4$ alkoxy $C_2$–$C_3$ alkyl group, $R^4$ is a hydrogen atom, and Z is an oxygen atom.

3. The dye composition according to claim 1, wherein in the formula (I), each of $R^1$ and $R^2$ is an ethyl group, $R^3$ is a methyl group, $R^4$ is a hydrogen atom, and Z is an oxygen atom, and the dye of the formula (I) has a crystal structure characterized by an X-ray diffraction pattern (CuKα) showing relatively strong peaks at diffraction angles (2θ) of 9.4°, 25.6° and 26.6° and intermediate peaks at diffraction angles (2θ) of 6.4°, 13.1°, 22.2° and 28.1°.

4. The dye composition according to claim 1, wherein in the formula (II), B is a hydrogen atom, A is

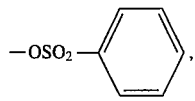

-continued

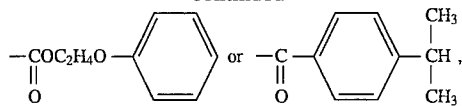

and $R^5$ is a $C_1$–$C_3$ alkyl group.

5. A turquoise blue dye composition, comprising at least one dye of the formula (I):

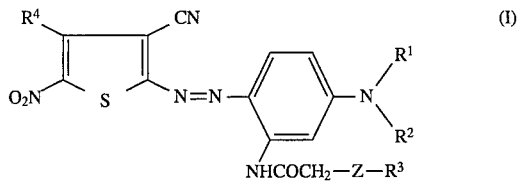

wherein each of $R^1$ and $R^2$, which are independent of each other, is a $C_1$–$C_5$ alkyl group, an allyl group or a $C_1$–$C_4$ alkoxy $C_2$–$C_3$ alkyl group, $R^3$ is a $C_1$–$C_5$ alkyl group, a $C_1$–$C_4$ alkoxy $C_2$–$C_3$ alkyl group or a phenyl group, $R^4$ is a hydrogen atom, a halogen atom or a methyl group, and Z is an oxygen atom or a sulfur atom, and at least one blue anthraquinone dye of the formula (III):

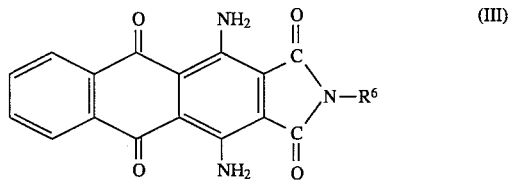

wherein $R^6$ is a $C_3$–$C_4$ alkyl group, a $C_1$–$C_4$ alkoxy, $C_2$–$C_3$ alkyl group or a $C_1$–$C_2$ alkoxy $C_2$–$C_3$ alkoxy $C_2$–$C_3$ alkyl group.

6. The dye composition according to claim 5, wherein in the formula (I), each of $R^1$ and $R^2$ is a $C_2$–$C_3$ straight chain alkyl group, $R^3$ is a $C_1$–$C_2$ alkyl group or a $C_1$–$C_4$ alkoxy $C_2$–$C_3$ alkyl group, $R^4$ is a hydrogen atom, and Z is an oxygen atom.

7. The dye composition according to claim 5, wherein in the formula (I), each of $R^1$ and $R^2$ is an ethyl group, $R^3$ is a methyl group, $R^4$ is a hydrogen atom, and Z is an oxygen atom, and the dye of the formula (I) has a crystal structure characterized by an X-ray diffraction pattern (CuKα) showing relatively strong peaks at diffraction angles (2θ) of 9.4°, 25.6° and 26.6° and intermediate peaks at diffraction angles (2θ) of 6.4°, 13.1°, 22.2° and 28.1°.

8. The dye composition according to claim 5, wherein in the formula (III), $R^6$ is a $C_1$–$C_2$ alkoxy $C_2$–$C_3$ alkyl group or a $C_1$ alkoxy $C_2$ alkoxy $C_2$–$C_3$ alkyl group.

9. A navy blue dye composition, comprising at least one dye of the formula (I):

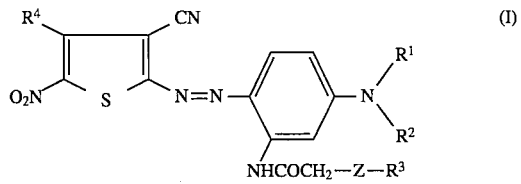

wherein each of $R^1$ and $R^2$, which are independent of each other, is a $C_1$–$C_5$ alkyl group, an allyl group or a $C_1$–$C_4$ alkoxy $C_2$–$C_3$ alkyl group, $R^3$ is a $C_1$–$C_5$ alkyl group, $C_1$–$C_4$ alkoxy $C_2$–$C_3$ group or a phenyl group, $R^4$ is a hydrogen atom, a halogen atom or a methyl group, and Z is an oxygen atom or a sulfur atom, and at least one navy blue dye of the formula (IV):

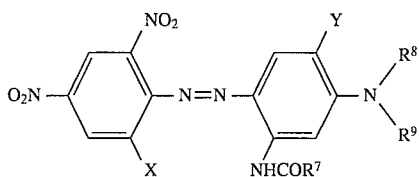

wherein X is a halogen atom, Y is a hydrogen atom, and $C_1$–$C_2$ alkoxy group or a $C_1$–$C_2$ alkoxy $C_1$–$C_2$ alkoxy group, $R^7$ is a $C_1$–$C_5$ alkyl group, and each of $R^8$ and $R^9$ which are independent of each other, is a hydrogen atom, an allyl group or a $C_1$–$C_5$ alkyl group, provided that $R^8$ and $R^9$ are not simultaneously hydrogen atom.

10. The dye composition according to claim 9, wherein in the formula (I), each of $R^1$ and $R^2$ is a $C_2$–$C_3$ straight chain alkyl group, $R^3$ is a $C_1$–$C_2$ alkyl group or a $C_1$–$C_4$ alkoxy $C_2$–$C_3$ alkyl group, $R^4$ is a hydrogen atom, and Z is an oxygen atom.

11. The dye composition according to claim 9, wherein in the formula (I), each of $R^1$ and $R^2$ is an ethyl group, $R^3$ is a methyl group, $R^4$ is a hydrogen atom, and Z is an oxygen atom, and the dye of the formula (I) has a crystal structure characterized by an X-ray diffraction pattern (CuKα) showing relatively strong peaks at diffraction angles (2θ) of 9.4°, 25.6° and 26.6° and intermediate peaks at diffraction angles (2θ) of 6.4°, 13.1°, 22.2° and 28.1°.

12. The dye composition according to claim 9, wherein in the formula (IV), X is a chlorine atom or a bromine atom, Y is a hydrogen atom, a methoxy group or a methoxyethoxy group, $R^7$ is a methyl group or an ethyl group, $R^8$ is a hydrogen atom or a $C_2$–$C_3$ alkyl group, and $R^9$ is a $C_2$–$C_3$ alkyl group.

* * * * *